US012609537B2

(12) United States Patent
Shi et al.

(10) Patent No.: US 12,609,537 B2
(45) Date of Patent: Apr. 21, 2026

(54) POWER CONVERSION SYSTEM AND AUXILIARY POWER SUPPLYING METHOD THEREOF

(71) Applicant: Delta Electronics (Shanghai) Co., Ltd., Shanghai (CN)

(72) Inventors: Xia Shi, Shanghai (CN); Bing Jiao, Shanghai (CN); Weihang Wang, Shanghai (CN); Jun Chen, Shanghai (CN); Yun Hua, Shanghai (CN); Zhizhen Lian, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 227 days.

(21) Appl. No.: 18/388,654

(22) Filed: Nov. 10, 2023

(65) Prior Publication Data

US 2024/0178766 A1    May 30, 2024

(30) Foreign Application Priority Data

Nov. 25, 2022    (CN) .......................... 202211492935.7

(51) Int. Cl.
H02J 4/25 (2026.01)
H02M 1/00 (2006.01)
H02M 7/68 (2006.01)

(52) U.S. Cl.
CPC ............. H02J 4/25 (2026.01); H02M 1/0003 (2021.05); H02M 7/68 (2013.01)

(58) Field of Classification Search
CPC .............................. H02M 7/68; H02M 1/0003
See application file for complete search history.

(56) References Cited

U.S. PATENT DOCUMENTS

| | | | | |
|---|---|---|---|---|
| 6,732,838 B1 * | 5/2004 | Okada | ...................... | B66B 1/30 |
| | | | | 187/296 |
| 6,930,460 B2 * | 8/2005 | Ishikawa | ................. | B60L 50/61 |
| | | | | 318/108 |
| 9,647,491 B2 * | 5/2017 | Navarro | .................... | H02J 7/00 |
| 10,007,284 B2 | 6/2018 | Enyedy et al. | | |
| 10,158,316 B2 * | 12/2018 | Sawamura | ............ | H02M 5/458 |
| 2002/0053490 A1 * | 5/2002 | Banno | ....................... | B66B 1/30 |
| | | | | 187/290 |

(Continued)

FOREIGN PATENT DOCUMENTS

| | | |
|---|---|---|
| CN | 102629776 A | 8/2012 |
| CN | 204615502 U | 9/2015 |

(Continued)

*Primary Examiner* — Daniel Cavallari
*Assistant Examiner* — Esayas G Yeshaw
(74) *Attorney, Agent, or Firm* — KIRTON McCONKIE; Evan R. Witt

(57) ABSTRACT

A power conversion system and an auxiliary power supplying method thereof are provided. The power conversion system includes AC and DC ports, an AC-DC converter, a bus capacitor, and a first auxiliary source. The AC port receives or provides an AC voltage, and the DC port provides or receives a DC voltage. The AC-DC converter has an AC terminal and a DC terminal electrically connected to the AC port and the DC port respectively. The bus capacitor is electrically connected to the DC terminal. The first auxiliary source has an input terminal electrically connected to the bus capacitor for receiving a capacitor voltage across the bus capacitor.

16 Claims, 4 Drawing Sheets

(56)     References Cited

U.S. PATENT DOCUMENTS

| 2009/0237016 A1* | 9/2009 | Iwashita | H02J 7/345 |
| | | | 318/400.3 |
| 2015/0333616 A1* | 11/2015 | Li | H02M 1/15 |
| | | | 713/300 |
| 2016/0087549 A1 | 3/2016 | Tamura et al. | |
| 2017/0229994 A1* | 8/2017 | Sawamura | H02M 5/458 |
| 2019/0036343 A1* | 1/2019 | Nelson | H02J 3/18 |
| 2023/0025134 A1* | 1/2023 | Kim | H02M 1/4233 |
| 2024/0266969 A1* | 8/2024 | Kamizuma | H02M 1/0009 |

FOREIGN PATENT DOCUMENTS

| CN | 113852174 A | 12/2021 |
| CN | 216215912 U | 4/2022 |
| EP | 3843253 A1 | 6/2021 |

* cited by examiner

POWER CONVERSION SYSTEM AND AUXILIARY POWER SUPPLYING METHOD THEREOF

CROSS-REFERENCE TO RELATED APPLICATION

This application claims priority to China Patent Application No. 202211492935.7, filed on Nov. 25, 2022, the entire contents of which are incorporated herein by reference for all purposes.

FIELD OF THE INVENTION

The present disclosure relates to a power conversion system and an auxiliary power supplying method thereof, and more particularly to auxiliary sources and an auxiliary power supplying method thereof applied in a power conversion system.

BACKGROUND OF THE INVENTION

The power conversion system is a specialized conversion equipment used in energy storage stations and is electrically connected to battery packs and the power grid. The power conversion system mainly provides functions such as peak-shaving and valley-filling, grid feeding, absorbing active energy and compensating for reactive energy. Moreover, the power conversion system may operate independently and supply power to some local loads.

The power conversion system has multiple operation modes, including a grid-connected operation mode, an off-grid operation mode (i.e., islanding mode) and an AFE (active forward end) mode. In the grid-connected operation mode, both the AC and DC sides of the power conversion system have power initially. In the off-grid operation mode, only the DC side has power initially. In the AFE mode, only the AC side has power initially. Furthermore, in all said three modes, power from an auxiliary source is required initially to provide the control-related electrical energy for allowing the power conversion system to start operating.

FIG. 1 exemplifies a specific implementation of an auxiliary source of a conventional power conversion system. As shown in FIG. 1, an AC-side auxiliary source is disposed in the power conversion system. To address the issue of low-voltage crossover in the power grid, an additional energy storage device, such as an uninterruptible power supply (UPS), needs to be disposed, which increases the cost. In addition, in the off-grid operation mode in which only the DC side has power initially, it is necessary to ensure that the UPS has power reserves at the beginning for allowing the AC-side auxiliary source to operate normally.

Under the circumstance that only one single auxiliary source is disposed, if the auxiliary source is disposed at the DC side, the AFE mode, in which only the AC side has power initially, also requires to dispose an additional energy storage device such as UPS. Similarly, it is necessary to ensure that the UPS has power reserves at the beginning for allowing the DC-side auxiliary source to operate normally.

FIG. 2 exemplifies another specific implementation of an auxiliary source of a conventional power conversion system. As shown in FIG. 2, an AC-side auxiliary source and a DC-side auxiliary source are disposed in the power conversion system. Therefore, as at least one of the AC and DC sides has power initially, power can be supplied by the corresponding auxiliary source to allow the power conversion system to operate.

However, in the various conventional power conversion systems described above, as shown in FIG. 1 and FIG. 2, when the power conversion system shuts down normally, a bus capacitor C at the DC side of the power conversion system needs to electrically connect to a discharging resistor R in parallel for discharging so as to meet the safety requirement. The safety requirement is that the bus capacitor C needs to be discharged to a certain level within a specific duration. For example, the bus capacitor C is discharged to lower than a safety voltage (36V) within five minutes. Therefore, the discharging resistor R required for discharging the bus capacitor C would increase the cost and volume.

Therefore, there is a need of providing a power conversion system and an auxiliary power supplying method thereof in order to overcome the drawbacks of the conventional technologies.

SUMMARY OF THE INVENTION

In accordance with an aspect of the present disclosure, a power conversion system is provided. The power conversion system includes an AC port, a DC port, an AC-DC converter, a bus capacitor, and a first auxiliary source. The AC port receives or provides an AC voltage, and the DC port provides or receives a DC voltage. The AC-DC converter has an AC terminal and a DC terminal electrically connected to the AC port and the DC port respectively. The bus capacitor is electrically connected to the DC terminal. The first auxiliary source has an input terminal electrically connected to the bus capacitor for receiving a capacitor voltage across the bus capacitor.

In accordance with another aspect of the present disclosure, an auxiliary power supplying method applied to the power conversion system is provided. The auxiliary power supplying method includes providing a first auxiliary source of the power conversion system which is electrically connected to the bus capacitor for receiving a capacitor voltage across the bus capacitor; electrically connecting an output terminal of the first auxiliary source to an energy consumption equipment of the power conversion system; and discharging the bus capacitor by supplying power to the energy consumption equipment when the capacitor voltage across the bus capacitor is higher than a first preset value or the power conversion system is shut down.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
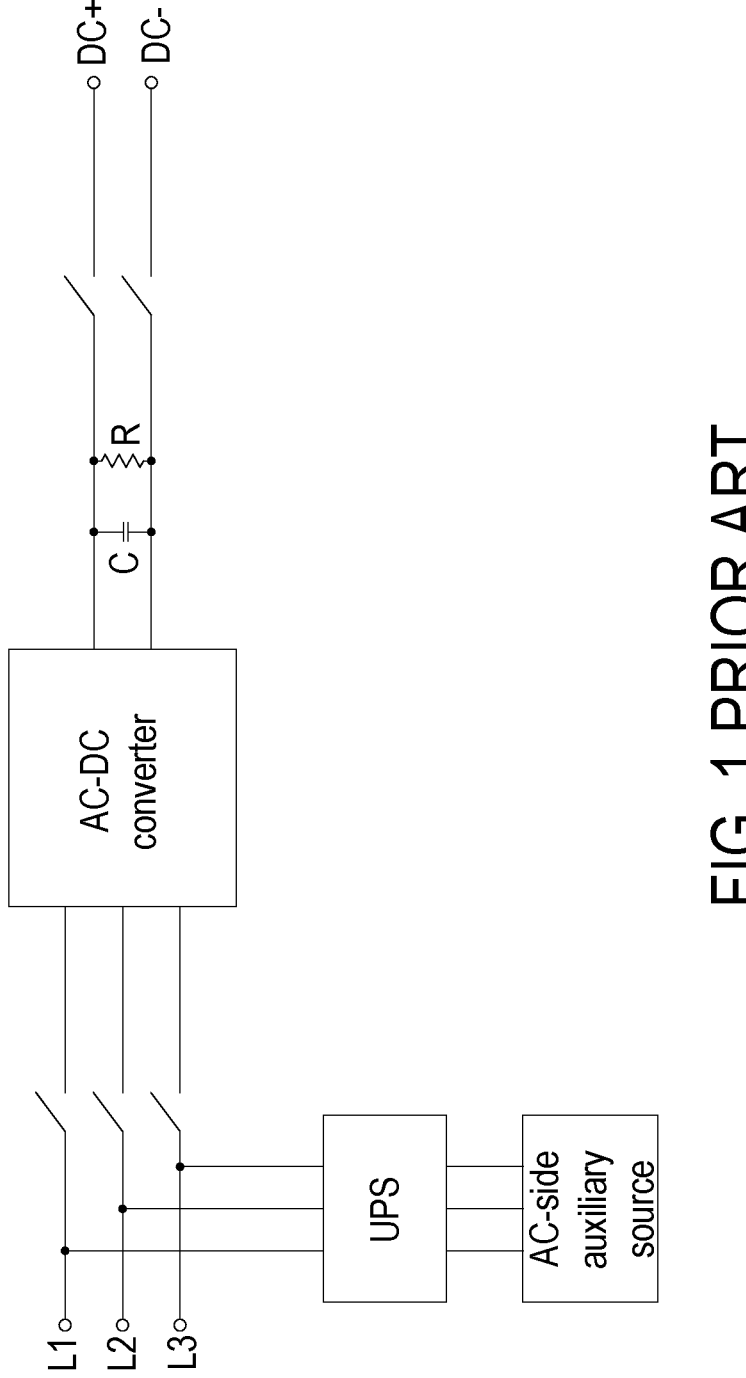
FIG. 1 and FIG. 2 exemplify two specific implementations of auxiliary sources of conventional power conversion systems.
Figure 2:
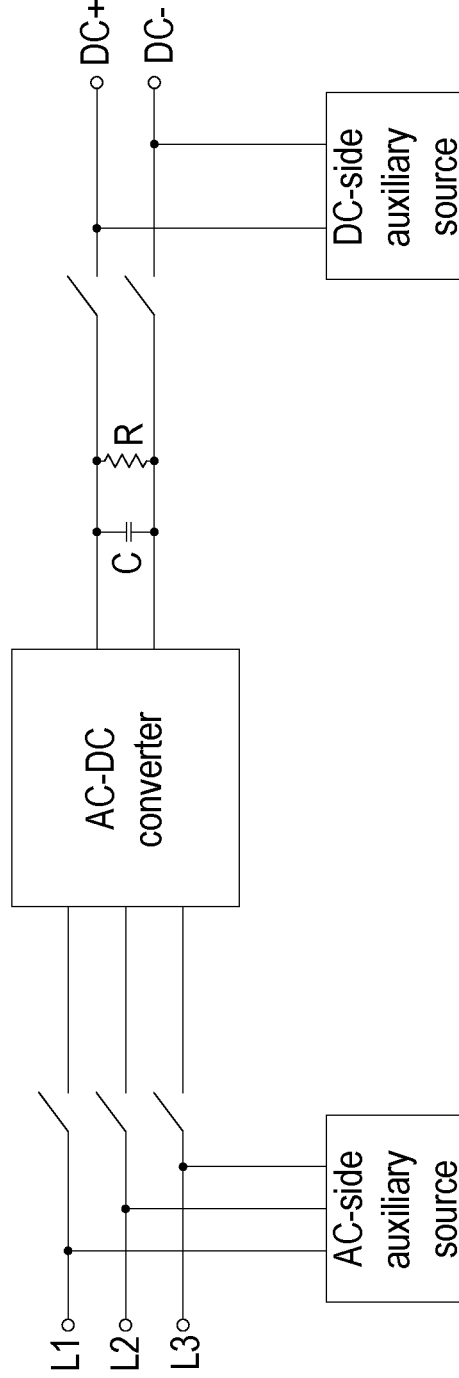
Figure 3:
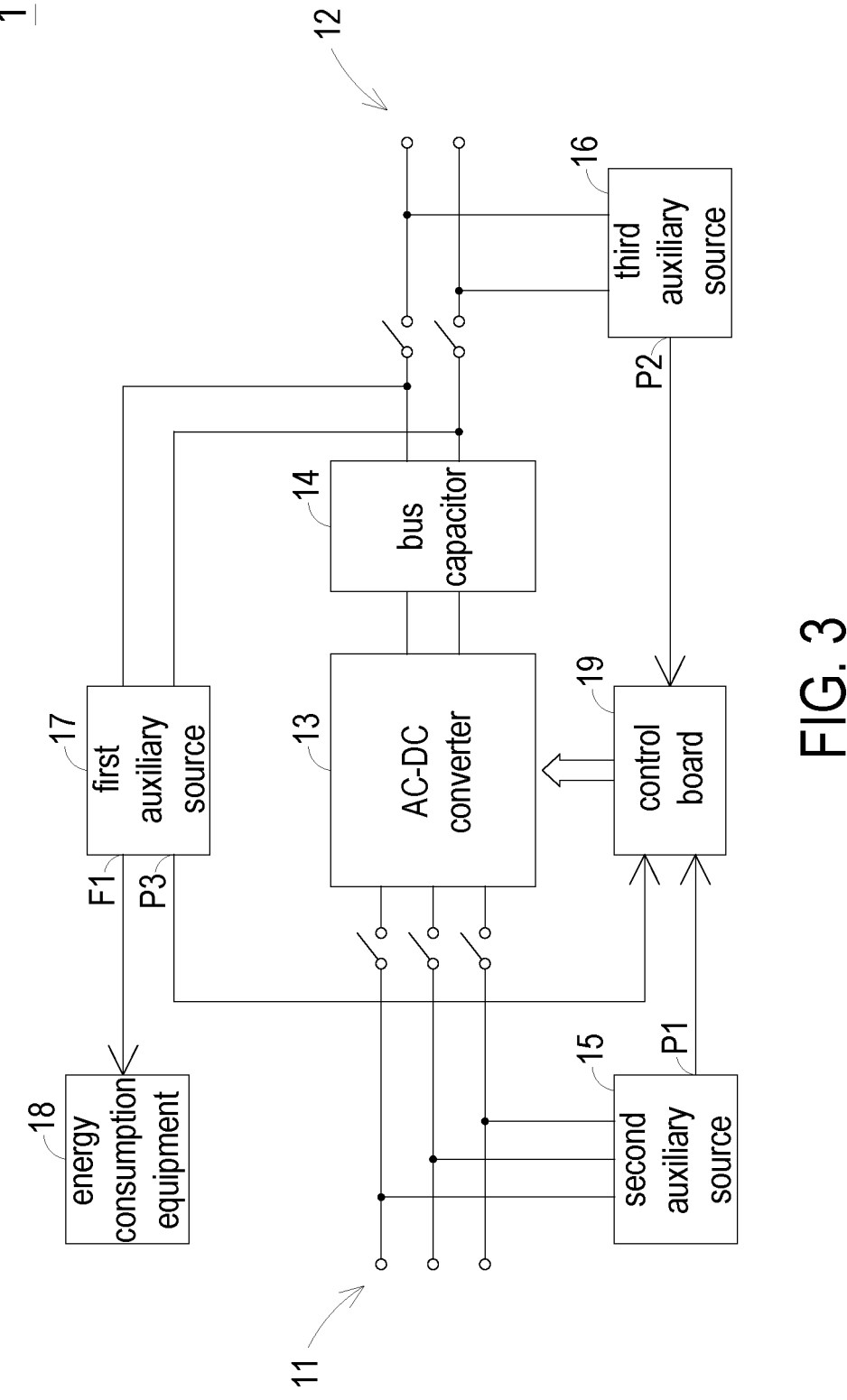
FIG. 3 is a schematic block diagram illustrating a power conversion system according to an embodiment of the present disclosure.

FIG. 3 is a schematic block diagram illustrating a power conversion system according to an embodiment of the present disclosure. As shown in FIG. 3, the power conversion system 1 includes an AC port 11, a DC port 12, an AC-DC converter 13, a bus capacitor 14, a first auxiliary source 17, a second auxiliary source 15 and a third auxiliary source 16. The AC port 11 is configured to receive or provide an AC voltage, and the DC port 12 is configured to provide or receive a DC voltage. The AC-DC converter 13 has AC and DC terminals electrically connected to the AC port 11 and the DC port 12, respectively. The bus capacitor 14 is electrically connected to the DC terminal of the AC-DC converter 13. An input terminal of the second auxiliary source 15 is electrically connected to the AC port 11 for receiving the AC voltage. An input terminal of the third auxiliary source 16 is electrically connected to the DC port 12 for receiving the DC voltage. An input terminal of the first auxiliary source 17 is electrically connected to the bus capacitor 14 for receiving a capacitor voltage across the bus capacitor 14. When the power conversion system 1 is shut down, the first auxiliary source 17 discharges the bus capacitor 14 by supplying power to the energy consumption equipment 18 of the power conversion system 1, thereby reducing the capacitor voltage below a safety voltage.

It is noted that the energy consumption equipment 18 can be any device that consumes electrical energy during operation, for example but not limited to a fan. In an embodiment, when the power conversion system 1 is shut down, the discharging rate of the bus capacitor 14 may be adjusted by varying the energy consumption level during the operation of the energy consumption equipment 18. For example, when the energy consumption equipment 18 is a fan, the discharging rate of the bus capacitor 14 may be adjusted by varying the fan's speed.

Consequently, in the present disclosure, since the second auxiliary source 15 and the third auxiliary source 16 are disposed at the AC and DC sides of the power conversion system 1 respectively, there is no need to dispose an additional energy storage device for the auxiliary sources. In addition, the power conversion system 1 further includes the first auxiliary source 17 electrically connected to the bus capacitor 14. When the power conversion system 1 is shut down, the first auxiliary source 17 discharges the bus capacitor 14 by supplying power to the energy consumption equipment 18, thereby reducing the capacitor voltage across the bus capacitor 14 below the safety voltage. As a result, there is no need to dispose an additional discharging resistor for discharging the bus capacitor 14. Compared to the conventional power conversion system, the power conversion system 1 of the present disclosure can reduce the cost and occupied volume.

As shown in FIG. 3, the power conversion system 1 further includes a control board 19 configured for controlling the operation of the AC-DC converter 13. The control board 19 is electrically connected to output terminals of the second auxiliary source 15, the third auxiliary source 16 and the first auxiliary source 17. The control board 19 is selectively powered by the second auxiliary source 15, the third auxiliary source 16 or the first auxiliary source 17, depending on circumstances. In particular, the second auxiliary source 15 includes at least one output terminal P1 electrically connected to the control board 19, and the third auxiliary source 16 includes at least one output terminal P2 electrically connected to the control board 19. The first auxiliary source 17 includes at least two output terminals F1 and P3, the output terminal F1 is electrically connected to one or more energy consumption equipment 18, and the output terminal P3 is electrically connected to the control board 19. An output voltage of the output terminal P1 is higher than an output voltage of the output terminal P2, and the output voltage of the output terminal P2 is higher than an output voltage of the output terminal P3. One of the output terminals P1, P2 and P3 is selected to provide an auxiliary power to the control board 19 according to the magnitude of output voltage, and the remaining unselected auxiliary sources serve as backups. When multiple auxiliary sources operate simultaneously, the auxiliary source with the highest output voltage is selected to provide the auxiliary power to the control board 19. For example, when the second auxiliary source 15, the third auxiliary source 16 and the first auxiliary source 17 operate simultaneously (e.g., in the grid-connected operation mode), the second auxiliary source 15 is selected to provide the auxiliary power to the control board 19, the third auxiliary source 16 serves as a primary backup, and the first auxiliary source 17 serves as a secondary backup. When the second auxiliary source 15 and the first auxiliary source 17 operate simultaneously (e.g., in the AFE mode), the second auxiliary source 15 is selected to provide the auxiliary power to the control board 19, and the first auxiliary source 17 serves as a primary backup. Under this circumstance, the third auxiliary source 16 stops operating, for example, the output voltage of the third auxiliary source 16 equals zero. When the third auxiliary source 16 and the first auxiliary source 17 operate simultaneously (e.g., in the off-grid operation mode or during low-voltage crossover), the third auxiliary source 16 is selected to provide the auxiliary power to the control board 19, and the first auxiliary source 17 serves as a primary backup. Under this circumstance, the second auxiliary source 15 stops operating, for example, the output voltage of the second auxiliary source 15 equals zero. When only the first auxiliary source 17 operates, the first auxiliary source 17 provides the auxiliary power to the control board 19. Generally, this happens in the situation that the power conversion system 1 is going to shut down due to failure, and the control board 19 is mainly used for recording and data preservation before shutdown. Further, under this circumstance, the second auxiliary source 15 and the third auxiliary source 16 stop operating, for example, the output voltages of the second auxiliary source 15 and the third auxiliary source 16 both equal zero.

It is noted that the magnitude relations between the output voltages of the output terminals of the auxiliary sources which are coupled to the control board 19 are not limited and may be designed according to actual requirements. For example, the output voltage of the output terminal of the third auxiliary source 16 may be the highest, or the output voltage of the output terminal of the first auxiliary source 17 may be the highest. Therefore, the present disclosure covers various implementations of the power conversion system including a plurality of auxiliary sources in which the auxiliary source with the highest output voltage is selected to provide the auxiliary power to the control board when multiple auxiliary sources operate simultaneously.

In an embodiment, depending on the actual application environment of the power conversion system 1, the auxiliary sources of the power conversion system 1 may include only the second auxiliary source 15 and the first auxiliary source 17. For example, when the DC port 12 of the power conversion system 1 is coupled to a consumptive load rather than a DC source (e.g., battery), there is no third auxiliary source 16 disposed. In another embodiment, the auxiliary sources of the power conversion system 1 may include only the third auxiliary source 16 and the first auxiliary source 17. For example, when the AC port 11 of the power conversion system 1 is coupled to a local load rather than an AC source (e.g., the power grid), there is no second auxiliary source 15 disposed.

Figure 4:
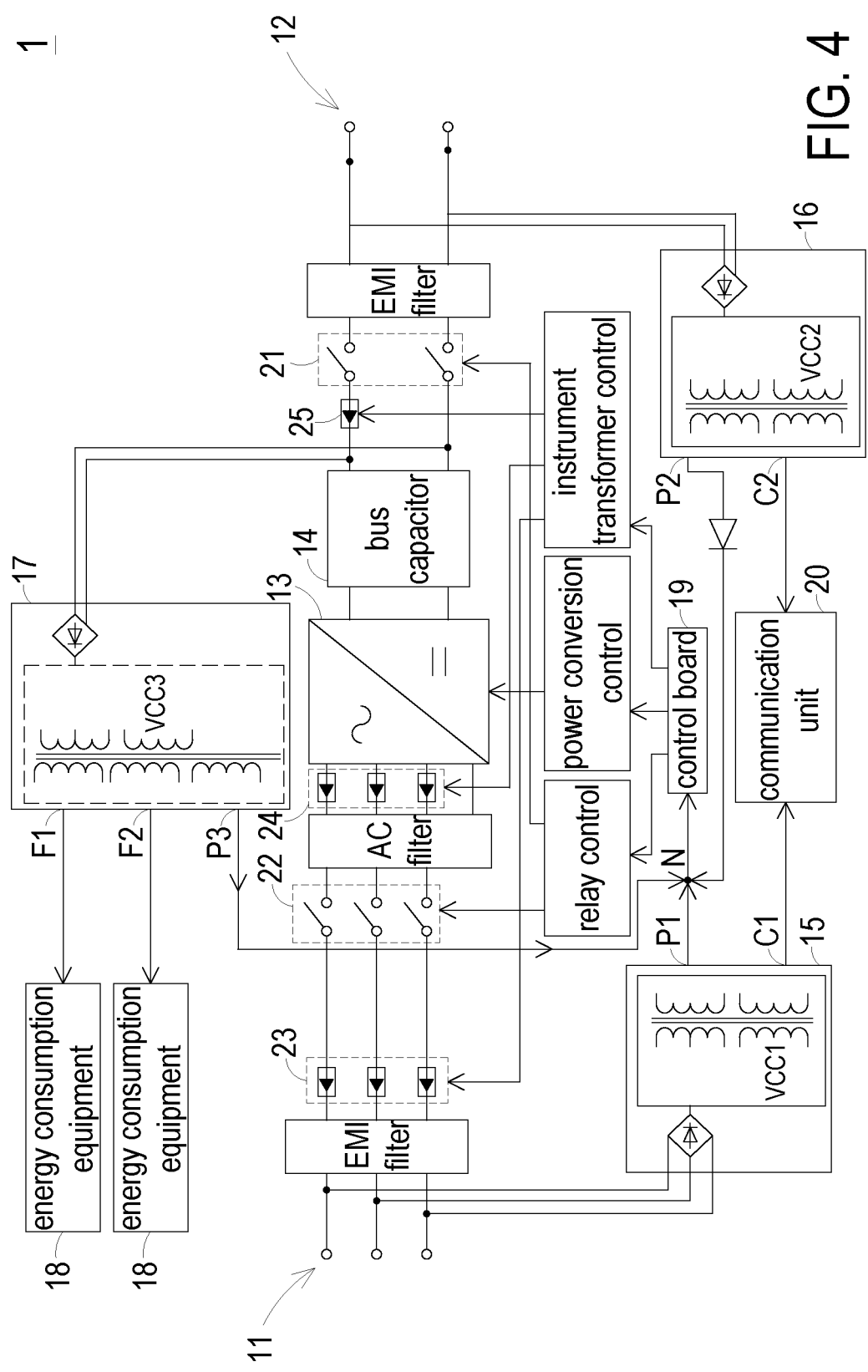
FIG. 4 exemplifies a specific implementation of the power conversion system of FIG. 3.

FIG. 4 exemplifies a specific implementation of the power conversion system of FIG. 3. As shown in FIG. 4, the input terminal of the first auxiliary source 17 has a positive input terminal and a negative input terminal electrically connected to the positive and negative terminals of the bus capacitor 14 respectively. The first auxiliary source 17 further includes a switch circuit (e.g., an anti-reverse diode circuit), and the input terminal of the first auxiliary source 17 is electrically connected to the bus capacitor 14 through this switch circuit. Moreover, the first auxiliary source 17 has a plurality of output terminals. As shown in FIG. 4, the first auxiliary source 17 has three output terminals F1, F2 and P3, the output terminal P3 is electrically connected to the control board 19, and the other output terminals F1 and F2 are separately and electrically connected to one or more energy consumption device 18. During the normal operation of the power conversion system 1, when the capacitor voltage across the bus capacitor 14 reaches a first preset value, the first auxiliary source 17 supplies power to the energy consumption device 18. At this time, the capacitor voltage across the bus capacitor 14 maintains stable and may be regarded as a DC power source for supplying power. The first preset value is corresponding to a set value of a bus voltage of the power conversion system 1. Each of the three output terminals F1, F2 and P3 includes an output winding and a rectifier diode (not shown) electrically connected to the output winding so as to obtain the required DC voltage.

The input terminal of the second auxiliary source 15 is electrically connected to the AC port 11 and is electrically coupled through the AC port 11 to an AC power source or an AC load (e.g., a three-phase AC power grid). The second auxiliary source 15 further includes a switch circuit (e.g., a rectifier diode circuit), and the input terminal of the second auxiliary source 15 is electrically connected to the AC port 11 through this switch circuit. The second auxiliary source 15 has two output terminals P1 and C1, and the output terminal P1 is electrically connected to the control board 19. Each of the two output terminals P1 and C1 includes an output winding and a rectifier diode (not shown) electrically connected to the output winding so as to obtain the required DC voltage. The input terminal of the third auxiliary source 16 is electrically connected to the DC port 12 and is electrically coupled to a DC power source or a DC load (e.g., a battery) through the DC port 12. The third auxiliary source 16 further includes a switch circuit (e.g., an anti-reverse diode circuit), and the input terminal of the third auxiliary source 16 is electrically connected to the DC port 12 through this switch circuit. The third auxiliary source 16 has two output terminals P2 and C2, and the output terminal P2 is electrically connected to the control board 19. Each of the two output terminals P2 and C2 includes an output winding and a rectifier diode (not shown) electrically connected to the output winding so as to obtain the required DC voltage. In an embodiment, the power conversion system 1 further includes a communication unit 20 configured for the communication between the power conversion system 1 and external devices. The output terminal C1 of the second auxiliary source 15 and the output terminal C2 of the third auxiliary source 16 are respectively and electrically connected to the communication unit 20 to provide the auxiliary power for the communication unit 20. The communication unit 20 may include an SELV (safety extra-low voltage) circuit, but not exclusively.

During normal operation, the output voltage of the output terminal P1 of the second auxiliary source 15 (e.g., 12.5V) is higher than the output voltage of the output terminal P2 of the third auxiliary source 16 (e.g., 12.1V-12.3V), and the output voltage of the output terminal P2 of the third auxiliary source 16 is higher than the output voltage of the output terminal P3 of the first auxiliary source 17 (e.g., 9V). The output terminal P1 of the second auxiliary source 15, the output terminal P2 of the third auxiliary source 16, and the output terminal P3 of the first auxiliary source 17 are collectively coupled to the control board 19. As shown in FIG. 4, the three output terminals P1, P2 and P3 are coupled to a common node N. While coupled to the control board 19, the potential at the common node N is pulled up (e.g., to 12.5V) by the voltage at the output terminal P1. The output voltages of the output terminals P2 and P3 equal zero since the rectifier diodes of the output terminals P2 and P3 are reversely cut off. Therefore, only the output terminal P1 provides power to the control board 19. The selection principle for the other auxiliary sources is similar, and thus the detailed descriptions thereof are omitted herein. The required output voltage at the output terminal may be obtained by changing the number of turns of the output winding or by electrically connecting voltage regulation elements in series to the output terminal. As an example, in this embodiment, the output winding of the output terminal P3 has the smallest number of turns, resulting in the lowest output voltage, and the output windings of the output terminals P1 and P2 have the same number of turns. Since a diode is electrically connected in series to the output circuit of the output terminal P2, the voltage outputted by the output winding of the second auxiliary source 16 passes through the diode and thus have a drop of 0.2-0.4V, which makes the output voltage of the output terminal P2 slightly lower than the output voltage of the output terminal P1.

It is noted that the values and magnitude relations of the output voltages of the output terminals in the present disclosure are not limited to that exemplified above and may be flexibly designed according to actual requirements. The output terminal P1 of the second auxiliary source 15 provides a second output voltage, the output terminal P2 of the third auxiliary source 16 provides a third output voltage, and the output terminal P3 of the first auxiliary source 17 provides a first output voltage. When the second auxiliary source 15, the third auxiliary source 16 and the first auxiliary source 17 all operate normally, the highest one of the first, second and third output voltages is selected to supply power for the control board 19. When the second auxiliary source 15 and the first auxiliary source 17 operate normally, the higher one of the first and second output voltages is selected to supply power for the control board 19. When the third auxiliary source 16 and the first auxiliary source 17 operate normally, the higher one of the first and third output voltages is selected to supply power for the control board 19. Generally, the output voltage provided to the control board 19 by the first auxiliary source 17 is lower than the output voltage provided to the control board 19 by the third auxiliary source 16, and the output voltage provided to the control board 19 by the third auxiliary source 16 is lower than the output voltage provided to the control board 19 by the second auxiliary source 15.

As shown in FIG. 4, if the power conversion system 1 operates in the AFE mode, the second auxiliary source 15 supplies power for the control board 19 and communication unit 20 since only the AC port 11 has power initially. If the power conversion system 1 operates in the off-grid operation mode, the third auxiliary source 16 supplies power for the control board 19 and communication unit 20 since only the DC port 12 has power initially. If the power conversion system 1 operates in the grid-connected operation mode, in which both the AC port 11 and the DC port 12 have power initially, the second auxiliary source 15 supplies power for the control board 19 and communication unit 20 since the output voltage of the second auxiliary source 15 is higher than the output voltage of the third auxiliary source 16. Further, in the grid-connected operation mode, if the AC voltage at the AC port 11 undergoes a low-voltage crossover, the second auxiliary source 15 stops operating. As the output voltage of the second auxiliary source 15 decreases to below the output voltage of the third auxiliary source 16, the control board 19 and the communication unit 20 are powered by the third auxiliary source 16 instead. In all the said modes, after the bus voltage is established, the first auxiliary source 17 has power and operates normally. Since the output voltage of the output terminal, electrically connected to the control board 19, of the first auxiliary source 17 is low, the first auxiliary source 17 does not supply power to the control board 19 but only powers the energy consumption equipment 18. Further, the first auxiliary source 17 serves as the primary or secondary backup for the power required by the control board 19 for controlling.

When both the AC voltage at the AC port 11 and the DC voltage at the DC port 12 are too low, the control board 19 is powered by the first auxiliary source 17. For example, when the AC voltage is lower than a second preset value and the DC voltage is lower than a third preset value, the first auxiliary source 17 supplies power for the control board 19. Since the energy stored in the bus capacitor 14 is large, the power provided by the first auxiliary source 17 allows the power conversion system 1 to have sufficient time for performing protection or shutdown procedures. Consequently, there is no need to dispose an additional energy storage device, thereby saving costs.

In addition, FIG. 4 exemplifies the specific topologies of the auxiliary sources. In FIG. 4, VCC1, VCC2 and VCC3 are the chip voltages of the second auxiliary source 15, the third auxiliary source 16 and the first auxiliary source 17, respectively. In fact, the energy sources for VCC1, VCC2 and VCC3 are also the voltages received by the input terminals of the auxiliary sources. When the AC voltage at the AC port 11 is higher than the second preset value, the second auxiliary source 15 provides two outputs configured to supply power for the control board 19 and the communication unit 20 respectively. The third auxiliary source 16 provides two outputs, with one output configured to supply power for the communication unit 20, and the other output of the third auxiliary source 16 is configured supply power for the control board 19 when the AC voltage at the AC port 11 is lower than the second preset value. The first auxiliary source 17 provides two types of outputs, with one type of output configured to supply power for the energy consumption device 18, and the other type of output of the first auxiliary source 17 is configured to supply power for the control board 19 when the AC voltage at the AC port 11 is lower than the second preset value and the DC voltage at the DC port 12 is lower than the third preset value. In addition, the number of the outputs which supply power for the energy consumption device 18 is not limited and may be two as exemplified in FIG. 4.

In an embodiment, the power conversion system 1 includes a grounding wire (i.e., PE wire) (not shown), the output terminal, electrically connected to the energy consumption device 18, of the first auxiliary source 17 has a positive output terminal and a negative output terminal. The positive output terminal is electrically connected to the corresponding energy consumption device 18, and the negative output terminal is electrically connected to the grounding wire. The insulation between the negative output terminal and the input terminal of the first auxiliary source 17 is realized through a transformer of the first auxiliary source 17. In addition, the energy consumption equipment 18 and the power wire thereof have low withstanding voltage specifications. Therefore, the negative output terminal is electrically connected to the grounding wire so that the insulation requirements for the energy consumption device 18 is reduced and the issues about insulation and withstanding voltage are solved. In order to meet the safety standards, the output terminals of the auxiliary sources which supply power for the control board (e.g., the output terminals P1, P2 and P3) have high withstanding voltage specifications (e.g., up to 4400 Vdc) and are insulated from the grounding wire.

In an embodiment, the power conversion system 1 further includes a DC relay assembly 21 electrically connected between the bus capacitor 14 and the DC port 12 and controlled by the control board 19. The input terminal of the first auxiliary source 17 is electrically connected to an inside of the DC relay assembly 21, and the input terminal of the second auxiliary source 16 is electrically connected to an outside of the DC relay assembly 21. In other words, the input terminal of the first auxiliary source 17 is electrically connected between the bus capacitor 14 and the DC relay assembly 21, and the input terminal of the third auxiliary source 16 is electrically connected between the DC relay assembly 21 and the DC port 12.

In an embodiment, the power conversion system 1 further includes an AC relay assembly 22 electrically connected between the AC port 11 and the AC terminal of the AC-DC converter 13 and controlled by the control board 19. In an embodiment, the power conversion system 1 further includes a first AC instrument transformer assembly 23, a second AC instrument transformer assembly 24, and a DC instrument transformer 25, all of which are controlled by the control board 19. The first AC instrument transformer assembly 23 is electrically connected between the AC port 11 and the AC relay assembly 22. The second AC instrument transformer assembly 24 is electrically connected between the AC relay assembly 22 and the AC terminal of the AC-DC converter 13. The DC instrument transformer 25 is electrically connected between the bus capacitor 14 and the DC relay assembly 21.

In an embodiment, each of the AC port 11 and the DC port 12 of the power conversion system 1 is further electrically connected to a corresponding EMI (electromagnetic interference) filter. The AC terminal of the AC-DC converter 13 is further electrically connected to an AC filter.

In summary, the present disclosure provides a power conversion system and an auxiliary power supplying method thereof. The power conversion system of the present disclosure includes an auxiliary source electrically connected to a bus capacitor. When the power conversion system is shut down, the auxiliary source discharges the bus capacitor by supplying power to the energy consumption equipment, thereby reducing the capacitor voltage across the bus capacitor to below the safety voltage. As a result, there is no need to dispose an additional discharging resistor for discharging the bus capacitor. Compared to the conventional power conversion system, the power conversion system of the present disclosure can reduce the cost and occupied volume.

Moreover, when the AC voltage is lower than the second preset value and the DC voltage is lower than the third preset value, the auxiliary source supplies power for the control board so that the power conversion system may have sufficient time for performing protection or shutdown procedures. In addition, auxiliary sources are further disposed at both a DC side and an AC side of the power conversion system, and there is no need to dispose an additional energy storage device for the auxiliary sources.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion system, comprising:
an AC port, receiving or providing an AC voltage;
a DC port, providing or receiving a DC voltage;
an AC-DC converter, having an AC terminal and a DC terminal electrically connected to the AC port and the DC port respectively;
a bus capacitor, electrically connected to the DC terminal; and
a first auxiliary source, having an input terminal electrically connected to the bus capacitor for receiving a capacitor voltage across the bus capacitor,
wherein the first auxiliary source has multiple output terminals, one of the multiple output terminals is electrically connected to a control board of the power conversion system, other of the multiple output terminals is electrically connected to an energy consumption equipment of the power conversion system, and when the capacitor voltage across the bus capacitor is higher than a first preset value, the first auxiliary source supplies power for the energy consumption equipment.

2. The power conversion system according to claim 1, further comprising a DC relay assembly electrically connected between the bus capacitor and the DC port, wherein the input terminal of the first auxiliary source is electrically connected between the bus capacitor and the DC relay assembly.

3. The power conversion system according to claim 1, wherein the input terminal of the first auxiliary source has a positive input terminal and a negative input terminal electrically connected to a positive terminal and a negative terminal of the bus capacitor respectively.

4. The power conversion system according to claim 1, further comprising:
a second auxiliary source, having an input terminal electrically connected to the AC port for receiving the AC voltage; and
a third auxiliary source, having an input terminal electrically connected to the DC port for receiving the DC voltage.

5. The power conversion system according to claim 4, further comprising a DC relay assembly electrically connected between the bus capacitor and the DC port, wherein the input terminal of the first auxiliary source is electrically connected between the bus capacitor and the DC relay assembly, and the input terminal of the third auxiliary source is electrically connected between the DC relay assembly and the DC port.

6. The power conversion system according to claim 4, wherein one of the first auxiliary source, the second auxiliary source and the third auxiliary source is selected to supply power for the control board of the power conversion system, and an output voltage of a selected auxiliary source is higher than an output voltage of an unselected auxiliary source.

7. The power conversion system according to claim 6, wherein the unselected auxiliary source serves as a primary backup or a secondary backup, when the output voltage of the selected auxiliary source decreases, the primary backup is used to supply power for the control board; and when output voltages of the selected auxiliary source and the primary backup decrease, the secondary backup is used to supply power for the control board.

8. The power conversion system according to claim 4, wherein when the AC voltage is higher than a second preset value, the second auxiliary source supplies power for the control board of the power conversion system, the third auxiliary source serves as a primary backup, and the first auxiliary source serves as a secondary backup; when the AC voltage is lower than the second preset value and the DC voltage is greater than a third preset value, the third auxiliary source supplies power for the control board, the second auxiliary source stops operating, and the first auxiliary source serves as a primary backup; and when the AC voltage is lower than the first second preset value and the DC voltage is lower than the third preset value, the first auxiliary source supplies power for the control board, and the second auxiliary source and the third auxiliary source stop operating.

9. The power conversion system according to claim 4, wherein the second auxiliary source has an output terminal electrically connected to the control board of the power conversion system, and when the second auxiliary source operates, the output terminal of the second auxiliary source provides a second output voltage; the third auxiliary source has an output terminal electrically connected to the control board, and when the third auxiliary source operates, the output terminal of the third auxiliary source provides a third output voltage; when the first auxiliary source operates, the output terminal, electrically connected to the control board, of the first auxiliary source provides a first output voltage; and wherein the second output voltage is higher than the third output voltage, and the third output voltage is higher than the first output voltage.

10. The power conversion system according to claim 9, wherein the output terminal, electrically connected to the energy consumption equipment, of the first auxiliary source has a positive output terminal and a negative output terminal electrically connected to the energy consumption equipment and a grounding wire respectively, and the output terminal of the first auxiliary source, electrically connected to the control board, is insulated from the grounding wire.

11. The power conversion system according to claim 1, wherein when the power conversion system is shut down, the first auxiliary source discharges the bus capacitor by supplying power to the energy consumption equipment of the power conversion system so that the capacitor voltage is below a safety voltage.

12. The power conversion system according to claim 11, wherein the energy consumption equipment comprises a fan, and when the power conversion system is shut down, a discharging rate of the bus capacitor is adjusted by varying a speed of the fan.

13. An auxiliary power supplying method of a power conversion system, wherein the power conversion system comprises an AC port, a DC port, an AC-DC converter, a bus capacitor and a control board, the AC port receives or provides an AC voltage, the DC port provides or receives a DC voltage, the AC-DC converter has an AC terminal and a DC terminal electrically connected to the AC port and the DC port respectively, the bus capacitor is electrically connected to the DC terminal, and the auxiliary power supplying method comprises:

providing a first auxiliary source of the power conversion system, wherein the first auxiliary source is electrically connected to the bus capacitor for receiving a capacitor voltage across the bus capacitor, and the first auxiliary source has multiple output terminals;

electrically connecting one of the multiple output terminals of the first auxiliary source to the control board, and electrically connecting other of the multiple output terminals of the first auxiliary source to an energy consumption equipment of the power conversion system; and discharging the bus capacitor by supplying power to the energy consumption equipment when the capacitor voltage across the bus capacitor is higher than a first preset value or the power conversion system is shut down.

14. The auxiliary power supplying method according to claim 13, wherein the power conversion system further comprises a second auxiliary source electrically connected to the AC port for receiving the AC voltage, and a third auxiliary source electrically connected to the DC port for receiving the DC voltage, and the auxiliary power supplying method further comprises: selecting one of the first auxiliary source, the second auxiliary source and the third auxiliary source to supply power for the control board, wherein an output voltage of a selected auxiliary source is higher than an output voltage of an unselected auxiliary source.

15. The auxiliary power supplying method according to claim 14, wherein when the AC voltage is higher than a second preset value, the second auxiliary source is selected to supply power for the control board, the third auxiliary source serves as a primary backup, and the first auxiliary source serves as a secondary backup; when the AC voltage is lower than the second preset value and the DC voltage is greater than a third preset value, the third auxiliary source is selected to supply power for the control board, the second auxiliary source stops operating, and the first auxiliary source serves as a primary backup; and when the AC voltage is lower than the second preset value and the DC voltage is lower than the third preset value, the first auxiliary source is selected to supply power for the control board, and the second auxiliary source and the third auxiliary source stop operating.

16. The auxiliary power supplying method according to claim 14, wherein the second auxiliary source has an output terminal electrically connected to the control board, and when the second auxiliary source operates, the output terminal of the second auxiliary source provides a second output voltage; the third auxiliary source has an output terminal electrically connected to the control board, and when the third auxiliary source operates, the output terminal of the third auxiliary source provides a third output voltage; when the first auxiliary source operates, the output terminal, electrically connected to the control board, of the first auxiliary source provides a first output voltage; and wherein the second output voltage is higher than the third output voltage, and the third output voltage is higher than the first output voltage.

\* \* \* \* \*